US010804700B2

(12) United States Patent
Cohen et al.

(10) Patent No.: US 10,804,700 B2
(45) Date of Patent: Oct. 13, 2020

(54) METHOD AND SYSTEM FOR OPTIMIZING AND PREDICTING DEMAND RESPONSE

(71) Applicant: GRID4C, Tel Aviv (IL)

(72) Inventors: Eran Cohen, Ramat Gan (IL); Alexander Zak, Jerusalem (IL); Eran Samuni, Giv'atayim (IL)

(73) Assignee: GRID4C, Herzlia (IL)

( * ) Notice: Subject to any disclaimer, the term of this patent is extended or adjusted under 35 U.S.C. 154(b) by 13 days.

(21) Appl. No.: 16/083,063

(22) PCT Filed: Mar. 8, 2017

(86) PCT No.: PCT/IL2017/050288
§ 371 (c)(1),
(2) Date: Sep. 7, 2018

(87) PCT Pub. No.: WO2017/153991
PCT Pub. Date: Sep. 14, 2017

(65) Prior Publication Data
US 2019/0097425 A1    Mar. 28, 2019

Related U.S. Application Data

(60) Provisional application No. 62/305,016, filed on Mar. 8, 2016.

(51) Int. Cl.
*H02J 3/14*     (2006.01)
*H02J 13/00*    (2006.01)
(Continued)

(52) U.S. Cl.
CPC .............. *H02J 3/14* (2013.01); *G05B 13/048* (2013.01); *H02J 13/0017* (2013.01);
(Continued)

(58) Field of Classification Search
CPC ...... G05B 13/048; H02J 3/14; H02J 13/0017; H02J 2003/003; H02J 2003/007;
(Continued)

(56) References Cited

U.S. PATENT DOCUMENTS 7,561,977 B2    7/2009  Horst et al.
2010/0262311 A1   10/2010 Santacatterina et al.
(Continued)

*Primary Examiner* — James J Lee
*Assistant Examiner* — Christopher W Carter
(74) *Attorney, Agent, or Firm* — Browdy and Neimark, P.L.L.C.

(57) ABSTRACT

The present invention provides a method for forecasting load and managing a control plan for households having electric appliances wherein the control plan determines the activation of the electric appliances at pre-defined control periods. The method comprises the steps of: pre-processing per meter of households historical consumption of electric appliances at control period in relation to time dependent environmental parameters and household profiles and control program parameters, creating forecast model of consumption of each controlled appliance during next control plan period based on said pre-processing enabling to simulate control program parameters according to predefined goals parameter including at least target cost or consumption, determining control plan parameters for incoming control period, based on forecast models using defined goal parameters and sending control instructions to each group member control module based on determined control plan parameters, time dependent parameters and measured environmental parameters within the household.

15 Claims, 5 Drawing Sheets

(51) Int. Cl.
  *G05B 13/04* (2006.01)
  *H02J 3/00* (2006.01)
(52) U.S. Cl.
  CPC ........... *H02J 3/003* (2020.01); *H02J 2203/20* (2020.01); *H02J 2310/14* (2020.01); *Y02B 70/3225* (2013.01); *Y02B 90/2607* (2013.01); *Y04S 20/222* (2013.01); *Y04S 40/12* (2013.01)
(58) Field of Classification Search
  CPC ........... H02J 2003/143; Y02B 70/3225; Y02B 90/2607; Y04S 20/222; Y04S 40/12
  USPC ....................................................... 700/275
  See application file for complete search history.

(56) References Cited

U.S. PATENT DOCUMENTS

| | | |
|---|---|---|
| 2014/0336836 A1 | 11/2014 | Borrett et al. |
| 2015/0295406 A1 | 10/2015 | Stewart |
| 2016/0086199 A1* | 3/2016 | Edmonds ............... G06Q 10/04 705/7.31 |

* cited by examiner

100 Control plan behavior history analysis module

- 110 Clustering consumer control group of consumers participating in the control plan into sub groups homogeneously

- 120 Pre-processing sub group of households per meter of house holds sub groups of historical consumption usage of controlled appliances at control period ( in peak consumption periods ) in relation to time depended environmental parameters and household profiles

- 130 identifying and measuring user actions in relation to controlled appliances at the control period in relation to time depended environmental parameters and household profiles

- 140 counting number of users which decided to quit the control plan program during the control period or after

- 150 Measuring household energy characteristics such as water heating and air temperature change in relation to control plan activities and time depended environmental parameters

- 155 analyzing the correlation between consumer actions and the number of quitting users consumers who have chosen to quit their participation in the demand control response plan

- 160 identifying statistical correlations between household actual periodic consumption pattern and the actual consumption rate of each appliance in relation to environmental time dependent parameters or life style of the occupant, such vacation schedule, working hours

- 170 Identifying statistical correlations between identified consumer actions, time-dependent environmental conditions, and household clusters

Fig.2

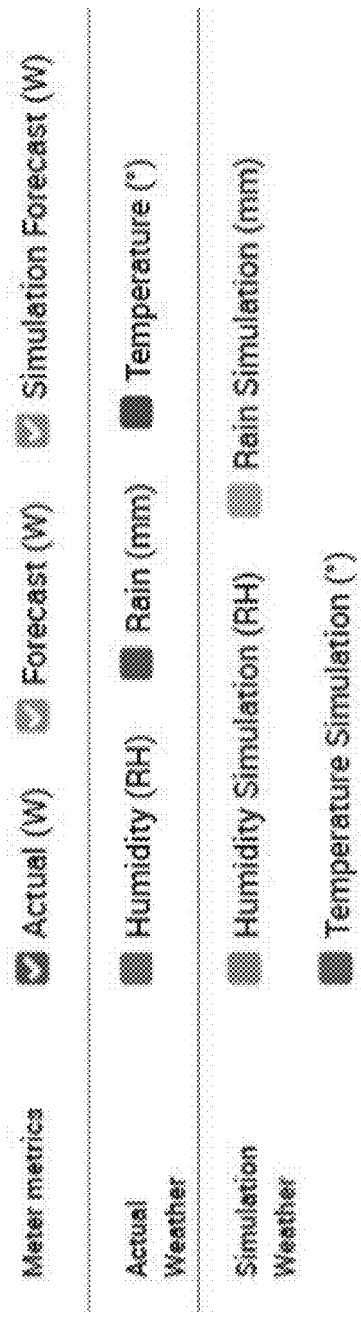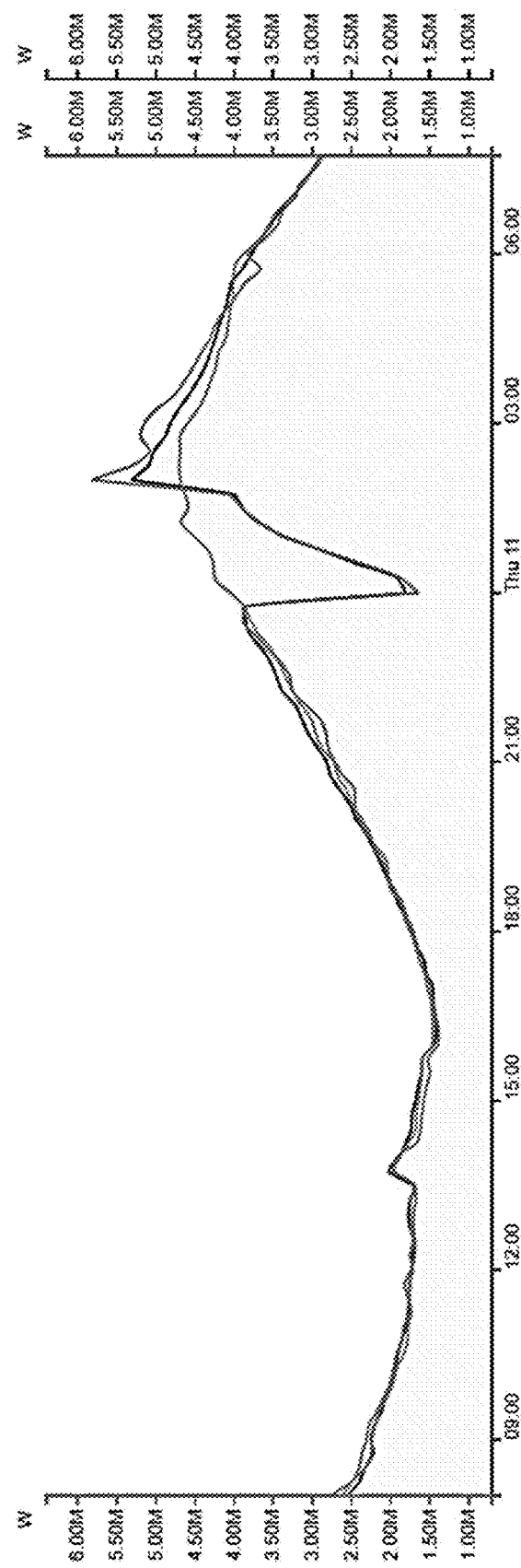
Fig.5

METHOD AND SYSTEM FOR OPTIMIZING AND PREDICTING DEMAND RESPONSE

TECHNICAL FIELD

The present invention relates to the field of managing electrical appliances in households and more specifically optimizing and predicting demand response.

BACKGROUND ART

Electrical energy is difficult to store, and the demand for electric power may fluctuate drastically among seasons, days of the week and hours of the day. This variance in electric power demand has put a strain on power utility companies, especially during periods of peak power consumption. Utility power companies have been dealing with this predicament in several methods:
   Controlling the production of power by taking generators on and offline: This method is problematic due to the high cost of operating these generators, the cost of not employing these expensive units, and the time it takes to return them to operating mode.
   Initiating local power shut-downs: This method indeed reduces power consumption but obviously presents many shortcomings
   Providing financial incentives for consumers to postpone the operation of electric appliances beyond peak power consumption periods: This solution requires educating the public, and is normally more suitable for large consumers.

Some energy utility companies provide systems or services which support remote control of specific electrical appliances such as HVACs and water heaters in houses. This facilitates lowering electricity consumption at peak power consumption periods. Such services are referred to as "Demand response"

For the utility companies it is critical to predict the effect of the demand response during controlled events itself and after the event, it is further critical to determine the size of the controlled group (for example number of houses) and time of the controlled event or optimizing the reduction goals.

Demand response provides an opportunity for consumers to play a significant role in the operation of the electric grid by reducing or shifting their electricity usage during peak periods in response to time-based rates or other forms of financial incentives. Demand response programs are being used by some electric system planners and operators as resource options for balancing supply and demand. Such programs can lower the cost of electricity in wholesale markets, and in turn, lead to lower retail rates.

SUMMARY OF INVENTION

The present invention provides a method for forecasting load and managing a control plan for households having controlled appliances wherein the control plan determines the activation of electrical appliances at pre-defined control periods, said method implemented by one or more processing devices operatively coupled to a non-transitory storage device, on which are stored modules of instruction code that when executed cause the one or more processing devices to perform:
   pre-processing per meter of training controlled groups households of historical consumption of electrical appliances at control period in relation to the at least one of following:
      time depended environmental parameters and household profiles;
      control program parameters including at least: period of control, size of group and threshold control parameters;
      user behavior parameters including feedback or non-feedback of the user, wherein the feedback includes at least one user action during the control plan;
   creating forecast model of consumption of each controlled appliance during next control plan period based on said pre-processing;
   determining control plan output parameters for incoming control period, based on forecast models;
   determining the group of households to participate in control plan based on control plan output parameters and
   Sending control instructions to each group member control module based on determined control plan parameters, time depended parameters and measured environmental parameter within the household.

According to some embodiments of the present invention the electrical appliances are remote controlled enabling to apply the control plan by activating of electrical appliances at pre-defined control periods based on the control instructions.

According to some embodiments of the present invention the control plan parameters include at least one of the following: the duration of the control period, the size and profile of control groups, thresholds parameters determining scheduled activation of the appliance.

According to some embodiments of the present invention the forecast model further enable to simulate control program parameters according to predefined goals parameters including at least target cost or target consumption;

According to some embodiments of the present invention the forecast model further enables estimating:
   house consumption usage periods which exceeds predefined threshold at future time periods,
   the contribution of each appliance to the total consumption based on identified correlations,
   the impact of reducing consumption of specific appliance of at least one homogenous group of users on the global consumption based on estimation of user's behavior during the consumption control.

According to some embodiments of the present invention the pre-processing includes analyzing the correlation between consumer actions and the number of consumers who have chosen to quit their participation in the demand control response plan.

According to some embodiments of the present invention the pre-process includes identifying statistical correlations between identified consumer actions, time-dependent environmental conditions, and household clusters The present invention provides a computer based system for forecasting load and managing a control plan for households having controlled appliances, said system comprising a non-transitory storage device and one or more processing devices operatively coupled to the storage device on which are stored modules of instruction code executable by the one or more processors:
   Control plan behavior History analyzing module for pre-processing per meter of households of historical consumption of electrical appliances at control period in relation to the at least one of following:
      time depended environmental parameters and household profiles;
      control program parameters including at least: period of control, size of group and threshold control parameters;

user behavior parameters including feedback or non feedback of the user wherein the feedback include at least one user action during the control plan;

Forecast modeling of control plan effect module for creating forecast model of consumption of each controlled appliance during next control plan period based on said pre-processing;

Control plan activation module determining control plan parameters for incoming control period, based on forecast models, determining the group of households to participate in the control plan based on control plan output parameters; and sending control instructions to each group member control module based on determined control plan parameters, time depended parameters and measured environmental parameter within the household.

According to some embodiments of the present invention the system further comprising appliance Control module which can apply the control plan by determining the activation of electrical appliances at pre-defined control periods.

According to some embodiments of the present invention the system further comprising sensors for measuring appliances consumption;

According to some embodiments of the present invention the control plan parameters include at least one of the following: the duration of the control period, the size and profile of control groups, thresholds parameters determining scheduled activation of the appliance.

According to some embodiments of the present invention the forecast model further enable to simulate control program parameters according to predefined goals parameters including at least target cost or target consumption;

According to some embodiments of the present invention the forecast model further enable estimates:

house consumption usage periods which exceeds predefined threshold at future time periods, the contribution of each appliance to the total consumption based on identified correlations, the impact of reducing consumption of specific appliance of at least one homogenous group of users on the global consumption based on estimation of user's behavior during the consumption control.

According to some embodiments of the present invention the pre-processing includes analyzing the correlation between consumer actions and the number of consumers who have chosen to quit their participation in the demand control response plan.

According to some embodiments of the present invention the pre-process includes identifying statistical correlations between identified consumer actions, time-dependent environmental conditions, and household clusters.

These, additional, and/or other aspects and/or advantages of the present invention are: set forth in the detailed description which follows; possibly inferable from the detailed description; and/or learnable by practice of the present invention.

BRIEF DESCRIPTION OF DRAWINGS

FIG. 2 is a flowchart illustrating a control plan behavior history analysis module, for measuring and identifying past changes in the use of household appliances through statistical correlations, according to some embodiments of the present invention.

FIG. 5 depicts a chart of overall power consumption of an experimental control group, during a period of one day.

DETAILED DESCRIPTION

Figure 1:
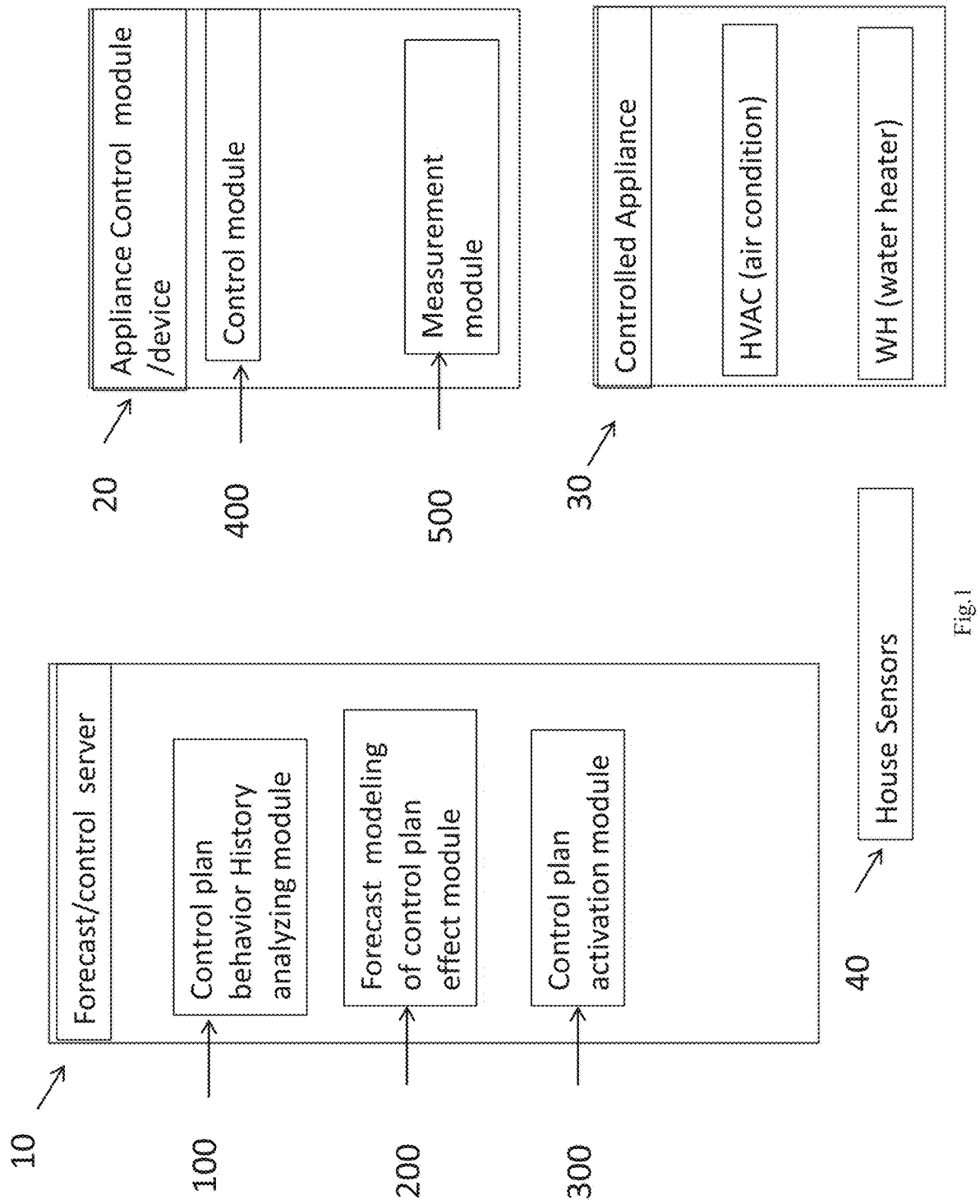
FIG. 1 is a block diagram of entities and modules for forecasting load and activating a control plan of household appliances according to some embodiments of the present invention.

It is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Following is a table of definitions of the terms used throughout this application.

| Term | Definition |
| --- | --- |
| Household profile | Properties that characterize a specific household, e.g.:<br>Type (Apartment, Flat, Villa)<br>Size (Area, Volume)<br>Geographic location<br>Existence of prominent power consuming appliances (e.g. HVAC)<br>Age<br>Building materials<br>Each household is defined as having a unique electric meter. |
| Consumers | The term 'consumer' in the context of this document refers to human individuals participating in a Demand response control plan. |
| Consumer profile | Properties that characterize specific household residents, e.g.:<br>Number and age of residents<br>Residents' lifestyle (e.g. are they working from home, and thus inhabit the household for long hours) |
| Household cluster | A sub-group the training group or control group of households that is homogenous in respect to household profile and consumer profile. |
| "Demand response control plan" (or "Control | A plan for monitoring, and optionally controlling the functionality of power consuming appliances, in an effort to obtain a predefined control plan goal (e.g. optimize power consumption).<br>The demand response control plan may be set to remotely control |

-continued

| Term | Definition |
|---|---|
| plan"), And Demand response control instructions (or "Control instructions") | electrical appliances via "Demand response control instructions" (e.g. turn a water heater off according to environmental conditions). The Control plan is derived from data contained in a "forecast model", and is constantly modified in an iterative manner, involving feedback or non feedback from consumers and subsequent fine-tuning of control instructions The control plan may be applied to "Controlled groups", throughout the control period or "Training groups" throughout the training period. |
| Training group | A group of households, in which: The household profile and consumer profile are well defined Elaborate power consumption data pertaining to specific electric appliances is accumulated throughout a training period Various sensors (e.g. humidity and temperature) are incorporated within the household Optionally, a demand response control plan is applied to the households that are members of the training group The data extracted from Training group households is analyzed to produce a demand response control plan for a larger group of households: The Controlled household group. Training group members normally participate in the utility company's demand response control plan in return for some kind of financial incentive. |
| Training period | A period in which power consumption data per electric utility is gathered from all households within the Training group. Optionally, a demand response control plan is applied to the households that are members of the training group throughout the training period. |
| Controlled group | A group of households upon which a demand response control plan is applied throughout a control period. Controlled group members normally participate in the utility company's demand response control plan in return for some kind of financial incentive. |
| Control period | A predefined period, for which a demand response control plan is applied to a control group, in an effort to reach predefined goals (e.g. reduce power consumption of the control group by a certain percentage). |
| Peak consumption period | A period at which the overall power, consumed by all households within the controlled group surpasses a predefined threshold. |
| Consumer actions | Actions applied by consumers to electric appliances during the control period, overriding operation parameters that were set by the demand response control plan. For example: the demand response control plan may set the HVAC temperature to 25 deg C., whereas a consumer may override this value, and set it to 27 deg C. |
| Forecast model | A data structure that is accumulated by analysis of user behavior collected from power consumers, pertaining to: The contribution of each electric appliance to the controlled group's power consumption Correlation between power consumption and environmental conditions (e.g. how often are water heaters employed during winter?) Correlation of probabilities between consumer actions and household conditions (e.g. the probability that a consumer would manually change the setting of an HVAC temperature to override a preset value) The Demand response control plan is derived from the said data, accumulated in the Forecast model. The Forecast model is initially structured according to user behavior from members of training groups during the training period. It is afterwards constantly fine-tuned through feedback from members of control groups during the control period. The Forecast model enables utility companies to: Pattern of consumption load of each house hold Anticipate consumption periods which exceeds predefined threshold e.g. peak periods Determine the contribution of each appliance to a household cluster's power consumption during peak periods Simulate the demand response control plan, to predict the effect of demand response actions to specific household clusters, in an endeavor to achieve a predefined goal. |

| Term | Definition |
| --- | --- |
| | Plan and determine which household profiles are best suited to take part in a control event, given the company's energy goals |

The present invention allows the utility companies to simulate demand response control instructions, predicting their effect on the demand response and allows the utility companies to optimize their demand response by selecting household clusters and an optimal number of households that best fit a model, in order to reach predefined demand response goals.

FIG. 1 is a block diagram of entities and modules for forecasting load and activating a control plan of households' appliances according to some embodiments of the present invention. The present invention provides an interface module enabling a user to determine output parameters of a demand response control plan, activated at predefined control periods, to apply changes to power consumption during periods when the consumption exceeds predefined threshold, e.g. peak periods.

The control plan is defined for control groups of consumers, who agree to participate in the demand response control plan, enabling utility companies to supervise the activation of specific appliances at their house at peak consumption periods.

Optionally at each house of the control group member is installed an appliance control device 20 which comprises control module 400 for controlling appliances such as HVAC 600 or WH 700 based on control plan instruction and measurement module 500 for measuring consumption of appliances.

Optionally are installed house sensors 40 to identify environmental conditions such as temperature or humidity.

The control module 400 receives demand response control instructions from the control plan activation module 300, which sets The forecast model is generated by Forecast modeling of control plan effect module 200 based on data received from the control plan behavior History analyzing module 100.

The control plan behavior History analyzing module 100 accumulates data regarding to consumer actions upon controlled appliances. Such data includes, for example:
  Activation or deactivation of controlled appliances (e.g. activation of an HVAC)
  Changes made to controlled appliances' settings (e.g. modification of the HVAC set temperature)

The control plan behavior History analyzing module 100 accumulates data regarding to Environmental conditions at the time and location of the said consumer action (e.g. temperature and humidity within the household, and in the household's geographic location when a change in the HVAC set temperature took place)

The control plan behavior History analyzing module 100 analyzes the said accumulated data to produce a set of statistic correlations between consumer actions and environmental conditions. An example for such a correlation is the probability that a consumer would manually change the HVAC temperature setting, in a given household temperature and humidity, to override an HVAC temperature setting that was preset by the control plan.

The control plan behavior History analyzing module 100 clusters houses according to household profiles and consumer profiles during the training period.

The control plan behavior History analyzing module 100 may refine and enhance the clustering of households during the control period by adding criteria in the clustering process based on identified statistic correlations between consumer actions and environmental conditions.

The forecast modeling module 200 acquires data from the control plan behavior History analyzing module 100. For example:
  It obtains the set of statistic correlations between consumer actions and environmental conditions
  It obtains the statistic correlations between household power consumption and environmental conditions (e.g. how often are water heaters employed during winter)
  It obtains the statistic correlations between training households' overall power consumption and the actual consumption of each appliance throughout the training period
  It obtains the clustering of households to subgroups.

The forecast modeling module 200 constructs the forecast model from the said acquired data and predicts the future consumption load of the house holds. This forecast model serves as the basis for the control plan module to determine a control plan output parameters for selecting the best fits available household clusters in an effort to achieve the predefined control plan goals.

The control plan activation module 300 determines the house holds to participate in the control group and instructions for controlling the appliances according of the control plan output parameters, according to the forecast model and the predefined control plan goals. Examples of control program output parameters:
  The size and profile of control groups,
  Thresholds parameters for activation or deactivation of controlled appliances,
  Scheduled activation or deactivation of the appliance;
  The instructions based on:
  the information accumulated in the Forecast model and goal parameters such as:
  minimum power consumption during peak periods or minimum cost of expenses to the utility company.

According to some embodiments of the present invention the appliances are not remote controlled and the system only provides estimations and forecasts.

FIG. 2 is an illustration flow chart of the control Plan Behavior History Analyzing Module (100). The process comprises the following steps:
  Clustering consumer control group of consumers participating in the control plan into homogeneous sub groups (step 110)
  Pre-processing of historical power consumption measurements per each controlled appliance at the subgroup of households, at control period (in consumption periods which exceeds predefined threshold, such as peak periods) in relation to time dependent environmental parameters or in relation to control plan output parameters (e.g. the temperature setting of an HVAC). The pre-processing includes analyzing the measurements, in relation to consumer profiles and household profiles of the sub-groups (step 120); The pre-processing, include identifying periodic patterns of consumption in relation to time dependent environmental parameters.

identifying consumer actions in relation to controlled appliances during the control period, and in relation to time dependent environmental parameters (step 130);

counting the number of users who decided to quit the control plan program at any given time (during the control period or after) (step 140);

measuring household water heating and air temperature change in relation to control plan instructions and consumer actions (step 150);

analyzing the correlation between power consumption of each household in and identified consumer actions, analyzing the correlation between identified consumer actions and indoor household conditions analyzing the correlation between consumer actions and the number of consumers who have chosen to quit their participation in the demand control response plan. (step 155);

Identifying statistical correlations between household actual periodic consumption pattern and the actual power consumption of each appliance in relation to environmental time dependent parameters or consumer and household profiles, such as their vacation schedule and working hours (step 160);

Identifying statistical correlations between identified consumer behavior, time-dependent environmental conditions, and household clusters or timed passed since the load control period has started (step 170). An example for such a correlation may be the probability that a consumer would manually change the setting of an HVAC temperature to override a preset value, when the outdoor temperature is 10 deg C., given that the said user lives in a flat in Manhattan.

The clustering of households is further fine-tuned according to the said identified statistical correlations.

Figure 3:
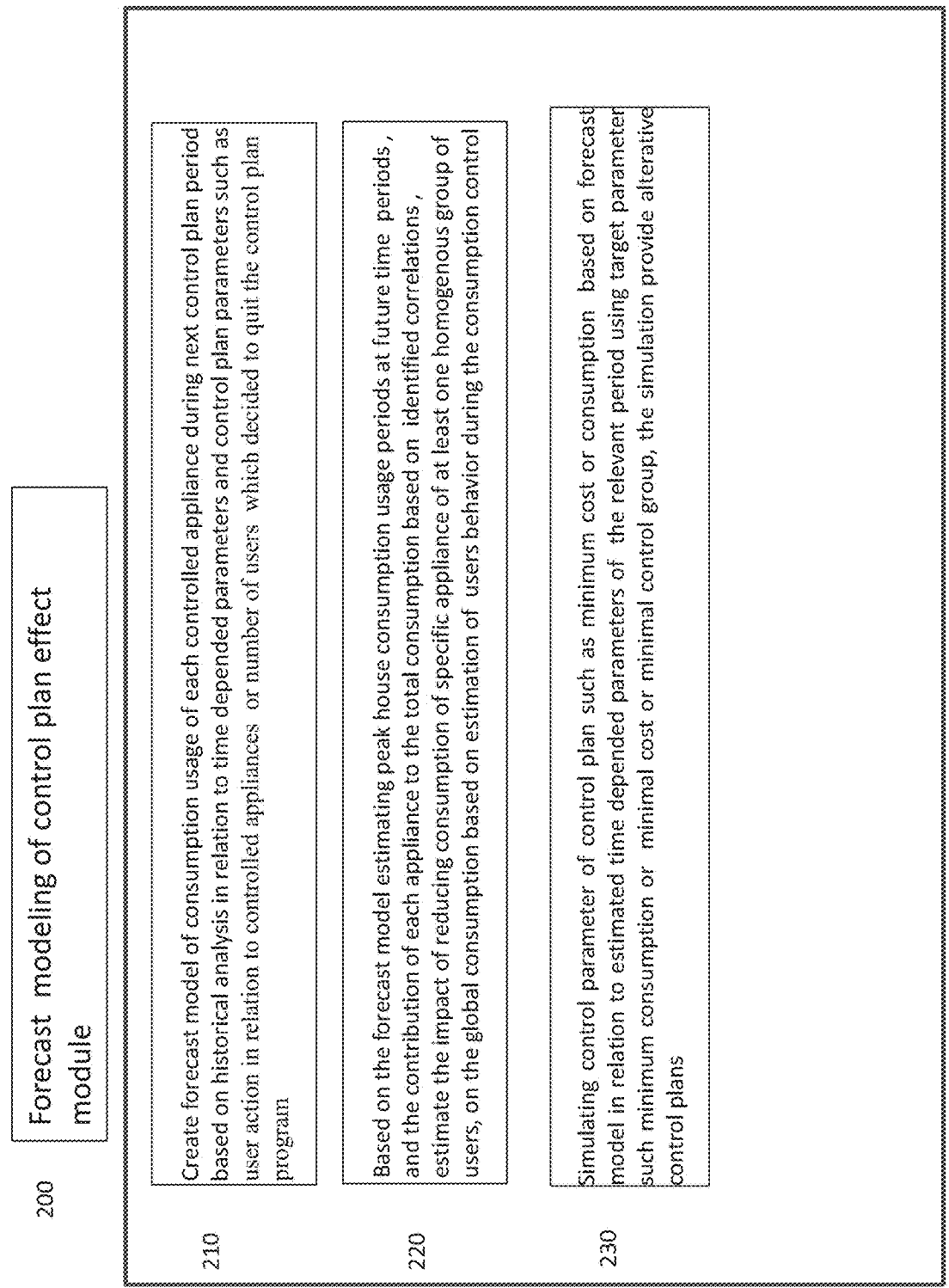
FIG. 3. is a flowchart illustrating forecast modeling of a control plan effect module, for calculating probabilities that a household appliance is in use, according to historical data.

FIG. 3 is an illustration flow chart of a Forecast Modeling of Control Plan Effect Module 200. The process comprises the following steps:

Creating forecast model of consumption of each controlled appliance during the training period. This forecast model is based on historical analysis in relation to:
  participating consumer profiles and household profiles, time dependent parameters
  control plan parameters such as user action in relation to controlled appliances
  identified correlations between household actual periodic consumption pattern and the actual consumption rate of each appliance (such as controlling the appliance at the peak period or number of users who decided to quit the control plan program (step 210);

Based on the forecast model, the Forecast Modeling of Control Plan Effect Module 200 estimates:
  consumption household's consumption pattern of each households;
  The house consumption usage periods which exceeds predefined threshold at future time periods
  The contribution of each appliance to the total consumption based on identified correlations, and
  The impact of reducing consumption of specific appliance of at least one homogenous household cluster of users on the global consumption based on estimation of consumer actions during the control period (step 220)

The Forecast Modeling of Control Plan Effect Module 200 facilitates simulating control parameters of control plan using different goal parameters such as minimum cost or consumption, based on forecast model in relation to estimated time dependent parameters of the relevant period using goal parameter such as minimum consumption or minimal cost or minimal control group, the simulation provides alterative control plans for different scenarios having different goals (step 230). Each control plan includes parameters such as:
  The size of the control group
  Specific household clusters that would be members of the control group
  Specific appliances that would be controlled by the control plan
  Thresholds and values that would be applied to the controlled appliances in relation to environmental conditions (e.g. temperature setting of an HVAC when the outdoors temperature is 10 deg C.),
  Scheduled activation and deactivation of controlled appliances (e.g. activation of a water heater beyond periods of peak power consumption)

Figure 4:
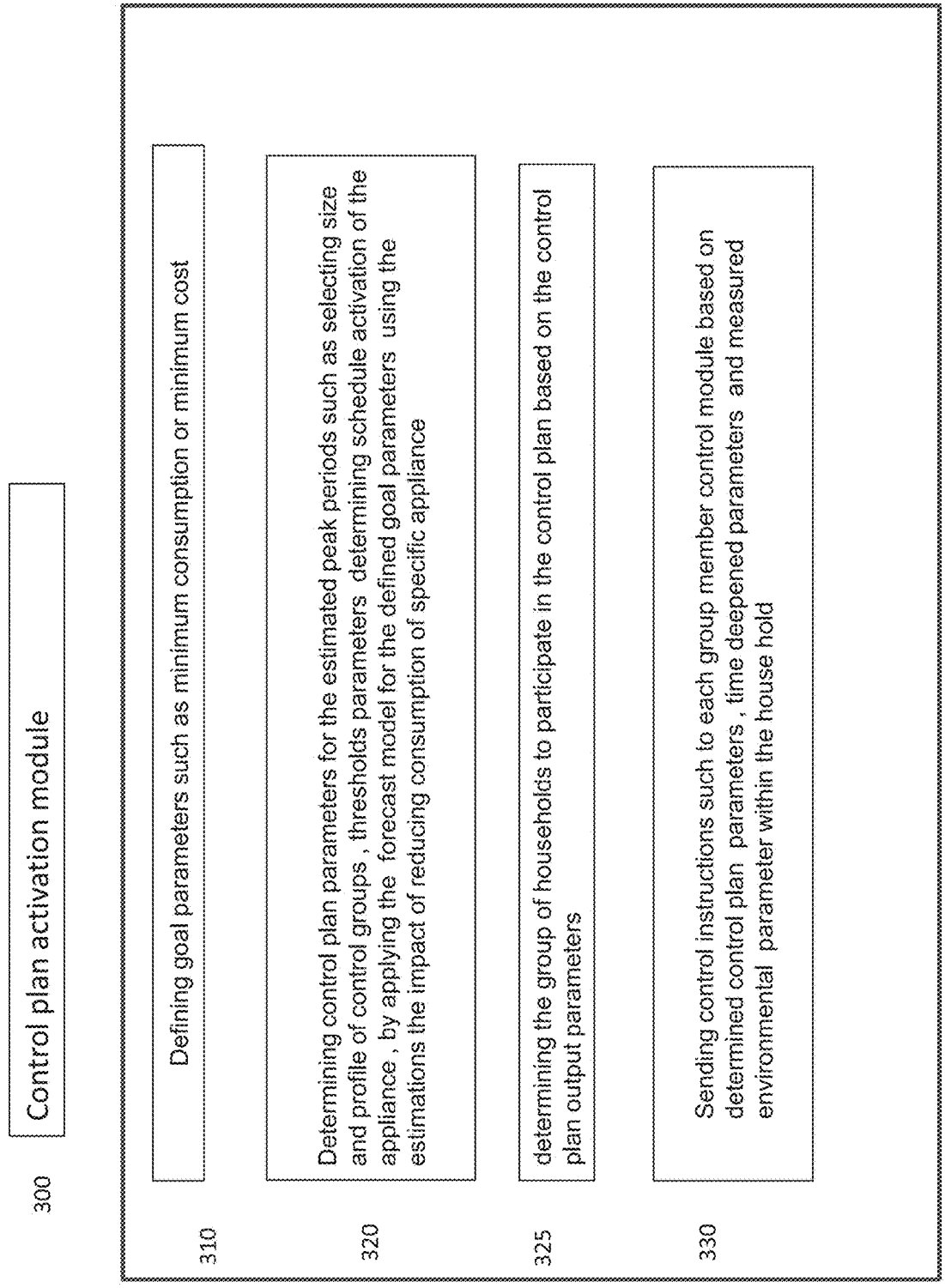
FIG. 4 is a flowchart illustrating a control plan activation module, according to some embodiments of the present invention.

FIG. 4 is a flowchart illustrating the Control plan activation module, according to some embodiments of the present invention.

The process comprises the following steps:

Defining goal parameters of the control plan. Such goal parameters may include:
  Reducing the total power consumption by a predefined percentage
  Reducing the total cost of expenses to the utility company Determining control plan parameters such as the duration of the control period, the size and profile of control groups, thresholds parameters determining scheduled activation of the appliance, based on forecast models using defined goal parameters such as minimum consumption or minimum cost (step 320);

determining the group of households to participate in the control plan based on the forecast model (325)

Sending control instructions to each controlled appliance within the controlled group of households, according to determined control plan parameters, time dependent parameters and measured environmental parameters within the household (step 330); FIG. 5 depicts a chart of overall power consumption of an experimental control group, during a period of one day;
  Line 1 presents the forecast of power consumption, without applying the demand response control plan.
  Line 2 presents the forecast of power consumption, assuming that a demand response control plan is applied.
  Line 3 presents the actual power consumption, following the application of the demand response control plan. The predefined goal of the control plan in this experiment was to minimize power consumption during late night hours of Wednesday, March 15.

The following conclusions are evident from the chart:
  The forecast of power consumption accurately follows the actual power consumption prior to the application of the control plan
  The forecast of power consumption accurately predicts the effect of application of the control plan upon the actual power consumption.
  The application of the control plan reduces power consumption in accordance to the predefined goals.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively, or in addition, the apparatus of the present invention may include, according to certain embodiments of the invention, a program as above which may be written in any conventional programming language, and optionally a machine for executing the program such as but not limited to a general-purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A method for forecasting electrical load and for managing a control plan for households having controlled appliances, said method implemented by one or more processing devices operatively coupled to a non-transitory storage device, on which are stored modules of instruction code that when executed cause the one or more processing devices to perform:
- pre-processing data of a control group of households, wherein the data includes historical consumption of electrical appliances during a control period, time dependent environmental parameters, and household profiles, and one or more of a control program parameter of a period of control and a size of group, a threshold control parameter, a user behavior parameter, and a feedback parameter of at least one user action; wherein the pre-processing comprises applying a machine learning algorithm on household power consumption, environmental conditions, overall power consumption of training households, and the actual consumption of each appliance throughout the training period, and the appliance behavior during or due to behavior and/or setting changes;
- responsively creating a forecast model of consumption of each controlled appliance during a subsequent control plan period; wherein the forecast model predicts the effect of application of the control plan upon the actual power consumption by estimating the impact of the changing reduction consumption of a specific appliance throughout the whole control period of at least one homogenous group of users, on the global consumption based on estimation of users and appliance behavior during the consumption control period, and based on the forecast model estimating peak house consumption usage periods at future time periods and the contribution of each appliance to the total consumption, the effect throughout the control period time of the appliance behavior/setting changes all based on machine learning algorithm;
- determining, based on the forecast model and estimated impact of changing reduction consumption of a specific appliance, a control plan, comprising control plan output parameters, for the subsequent control plan period; wherein the control plan output parameters include scheduled activation and deactivation and changing setting of controlled appliances;
- determining households to be group members to participate in the control plan; and
- sending control instructions based on the control plan output parameters to each group member;
- wherein control plan output parameters include at least one of the following: the duration of the control period, the size and profile of control groups, thresholds parameters determining scheduled activation deactivation or behavior/setting changes of the appliance, specific household clusters that would be members of the control group; specific appliances that would be controlled by the control plan, thresholds and values that would be applied to the controlled appliances in relation to environmental conditions and scheduled activation and deactivation and changing setting of controlled appliances.

2. The method of claim 1 wherein the electrical appliances are remote-controlled appliances and wherein the control instructions perform remote control.

3. The method of claim 1 wherein control plan parameters include all of the following: the duration of the control period, the size and profile of control groups, thresholds parameters determining scheduled activation of the appliance.

4. The method of claim 1 wherein the forecast model further enables to simulate control program parameters according to predefined goals parameters including at least target cost or target consumption.

5. The method of claim 1 wherein the forecast model further enables the generation of the following estimates:
- house consumption usage periods which exceeds predefined threshold at future time periods,
- the contribution of each appliance to the total consumption based on identified correlations,
  - the impact of reducing consumption of specific appliance of at least one homogenous group of users on the global consumption based on estimation of user's behavior during the consumption control.

6. The method of claim 1 wherein the pre-processing includes predicting the consumer actions and the number of consumers who have chosen to quit their participation in the demand control response plan or that changed their setting during the demand control response plan.

7. The method of claim 1 wherein the pre-processing includes identifying and further predicting the consumer actions, time-dependent environmental conditions, and household home profile clusters.

8. A computer-based system for forecasting load and managing a control plan for households having controlled appliances, said system comprising a non-transitory storage device and one or more processing devices operatively coupled to the storage device on which are stored modules of instruction code executable by the one or more processors:
- control plan behavior history analyzing module for pre-processing per meter of households of historical consumption of electrical appliances at control period in relation to the at least one of following:
  - time depended environmental parameters and household profiles;
  - control program parameters including at least: period of control, size of group and threshold control parameters;
  - user behavior parameters including feedback or non-feedback of the user wherein the feedback includes at least one user action during the control plan;
- wherein the pre-processing comprises applying a machine learning algorithm on household power consumption, environmental conditions, overall power consumption of training households, and the actual consumption of each appliance throughout the training period, and the appliance behavior during or due to behavior and/or setting changes;
- forecast modeling of control plan effect module for creating forecast model of consumption of each controlled appliance during next control plan period based on said pre-processing; wherein the forecast model predicts the effect of application of the control plan upon the actual power consumption by estimating the impact of the changing reduction consumption of a specific appliance throughout the whole control period of at least one homogenous group of users, on the global consumption based on estimation of users and appliance behavior during the consumption control period, and based on the forecast model estimating peak house consumption usage periods at future time periods and the contribution of each appliance to the total consumption, the effect throughout the control period time of the appliance behavior/setting changes all based on machine learning algorithm;
- control plan activation module determining control plan parameters for incoming control period, based on forecast models, determining the group of households to participate in the control plan based on control plan output parameters and estimated impact of changing reduction consumption of a specific appliance, wherein the control plan output parameters include scheduled activation and deactivation and changing setting of controlled appliances; and sending control instructions to each group member control module based on determined control plan parameters, time depended parameters and measured environmental parameter within the household, wherein control plan parameters include at least one of the following: the duration of the control period, the size and profile of control groups, thresholds parameters determining scheduled activation deactivation or behavior/setting changes of the appliance; specific household clusters that would be members of the control group; specific appliances that would be controlled by the control plan; thresholds and values that would be applied to the controlled appliances in relation to environmental conditions and scheduled activation and deactivation and changing setting of controlled appliances.

9. The system of claim 8 further comprising appliance Control module which can apply the control plan by determining the activation/deactivation or behavior/setting changes of electrical appliances at pre-defined control periods.

10. The system of claim 8 further comprising sensors for measuring appliance consumption.

11. The system of claim 8 wherein control plan parameters include at least some of the following: the duration of the control period, the size and profile of control groups, thresholds parameters, and a schedule of activation of the appliance.

12. The system of claim 8 wherein the forecast model further enables to simulate control program parameters according to predefined goals parameters including at least target cost or target consumption.

13. The system of claim 8 wherein the forecast model further enables estimating:
house consumption usage periods which exceeds pre-defined threshold at future time periods,
the contribution of each appliance to the total consumption based on identified correlations,
the impact of the demand response event on the overall house consumption during the event of at least one homogenous group of users on the global consumption based on estimation of user's behavior during the consumption control.

14. The system of claim 8 wherein the pre-processing includes analyzing the correlation between consumer actions and the number of consumers who have chosen to quit their participation during the demand control response plan and/or override the demand respond instructions during the demand control response plan.

15. The system of claim 8 wherein the pre-process includes identifying and predicting identified consumer actions, time-dependent environmental conditions, and household clusters.

* * * * *